Figure 1:
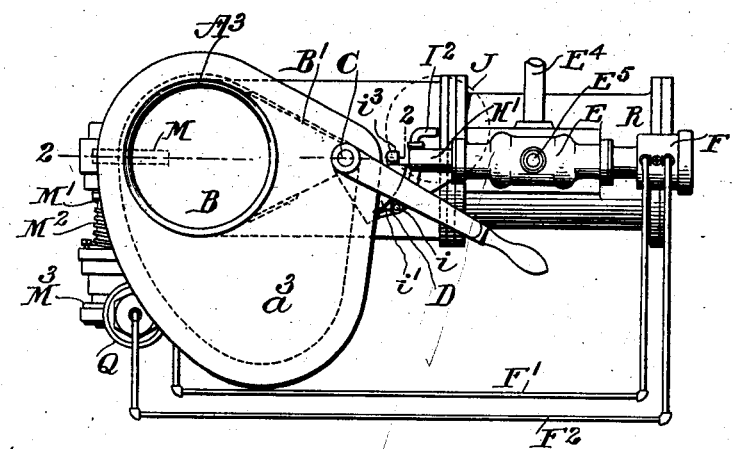

No. 746,266. PATENTED DEC. 8, 1903.
B. C. BATCHELLER.
SENDING DEVICE FOR PNEUMATIC TUBES.
APPLICATION FILED OCT. 11, 1900.

NO MODEL. 4 SHEETS—SHEET 1.

WITNESSES. INVENTOR.

No. 746,266. PATENTED DEC. 8, 1903.
B. C. BATCHELLER.
SENDING DEVICE FOR PNEUMATIC TUBES.
APPLICATION FILED OCT. 11, 1900.
NO MODEL. 4 SHEETS—SHEET 2.
FIG. 4.
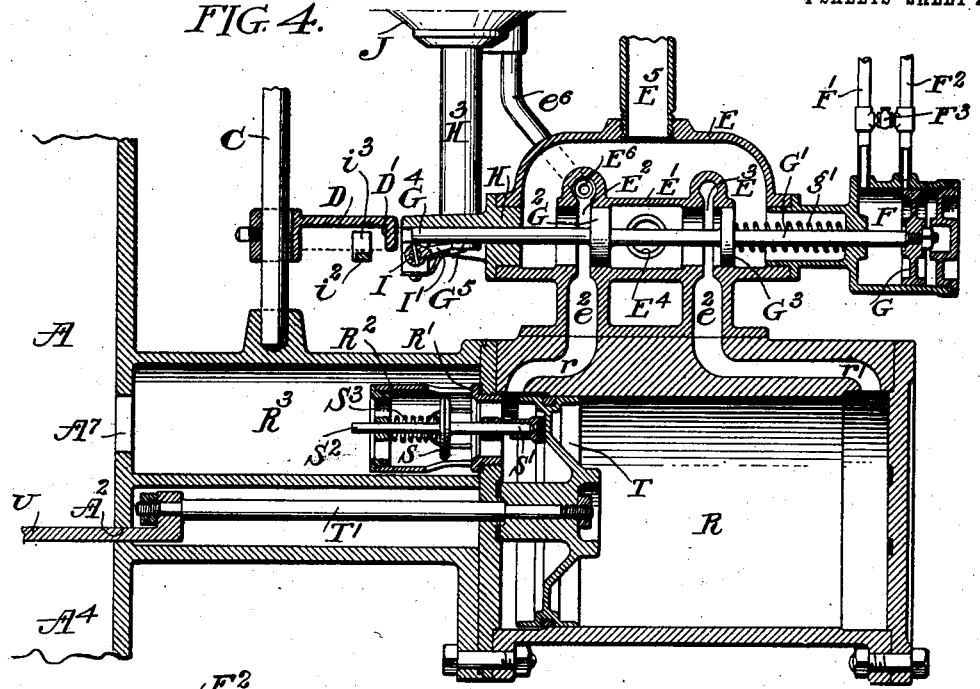
FIG. 5.
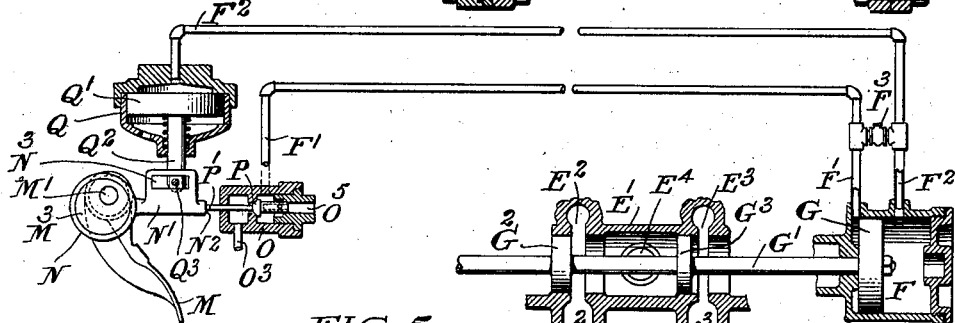
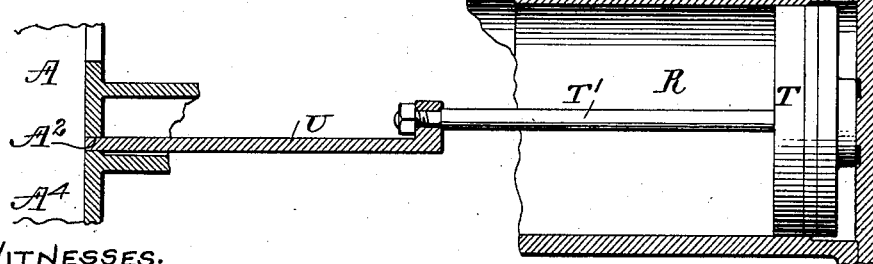
WITNESSES. INVENTOR.

No. 746,266. PATENTED DEC. 8, 1903.
B. C. BATCHELLER.
SENDING DEVICE FOR PNEUMATIC TUBES.
APPLICATION FILED OCT. 11, 1900.
NO MODEL. 4 SHEETS—SHEET 3.
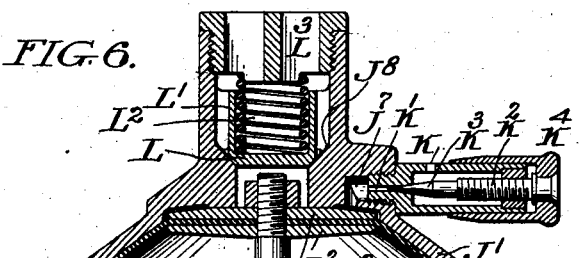
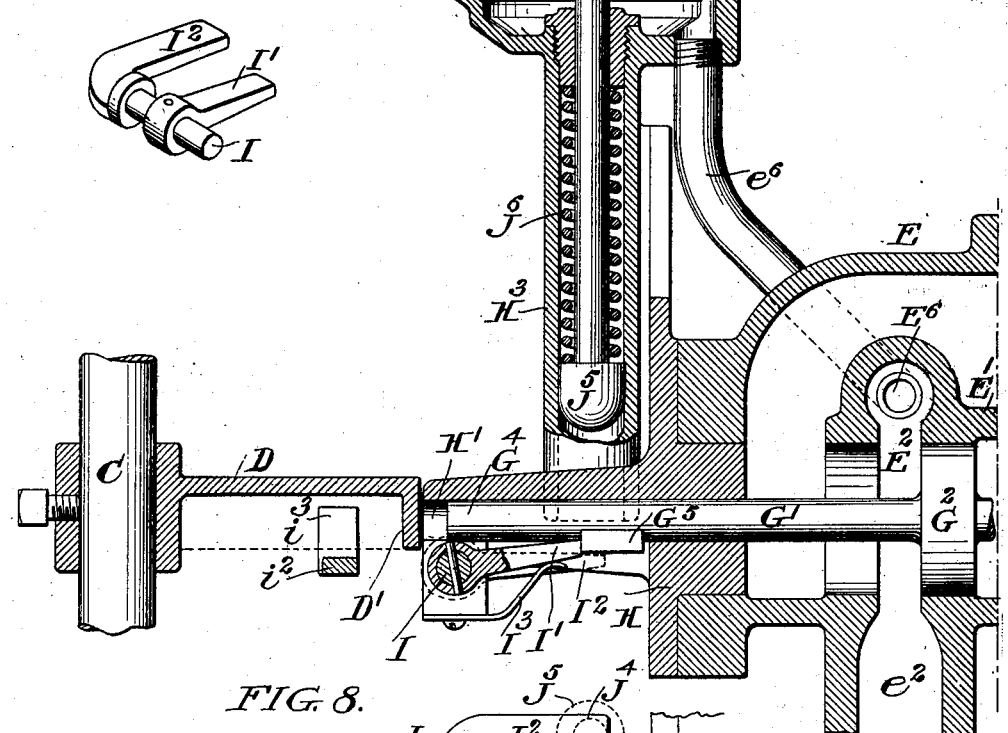
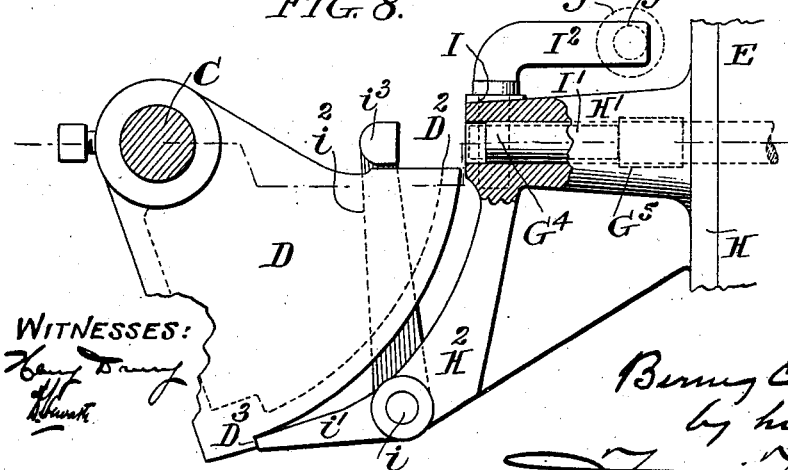
WITNESSES: INVENTOR:

No. 746,266. PATENTED DEC. 8, 1903.
B. C. BATCHELLER.
SENDING DEVICE FOR PNEUMATIC TUBES.
APPLICATION FILED OCT. 11, 1900.
NO MODEL. 4 SHEETS—SHEET 4.

WITNESSES. INVENTOR.

No. 746,266. Patented December 8, 1903.

UNITED STATES PATENT OFFICE.

BIRNEY C. BATCHELLER, OF PHILADELPHIA, PENNSYLVANIA.

SENDING DEVICE FOR PNEUMATIC TUBES.

SPECIFICATION forming part of Letters Patent No. 746,266, dated December 8, 1903.

Application filed October 11, 1900. Serial No. 32,682. (No model.)

*To all whom it may concern:*

Be it known that I, BIRNEY C. BATCHELLER, a citizen of the United States of America, residing in the city and county of Philadelphia, in the State of Pennsylvania, have invented certain new and useful Improvements in Sending Devices for Pneumatic Tubes, of which the following is a true and exact description, reference being had to the accompanying drawings, which form a part thereof.

My invention relates to pneumatic-tube systems, and particularly to mechanism whereby a carrier is inserted in the tube for transmission.

The object of my invention is to provide a simple and efficient sending device and particularly one in which provision is made against the simultaneous opening of the two gates which form a part of the apparatus and in which also provision is made against the too rapid sending of successive carriers.

My sender is one having a tube-section into which the carrier is inserted and which tube-section is provided with an end gate and an inner gate, my invention in its broader form consisting in the provision of special means for opening the inner gate, which is set in motion by the closing of the end gate, and in the further provision of special means for successively closing the inner gate and opening the end gate, arranged in such a manner as to be set in operation by the exit of a carrier from the tube-section.

Another important feature of my invention consists in means whereby compressed air is admitted to the tube-section after the end gate is closed and before the inner gate is open.

A further and very important feature of my invention consists in the provision of a lock arranged to prevent the opening of the inner gate, which lock operates after each closing movement of said gate and for a determined time regulated by the action of a time-escapement device, preferably pneumatic in character, which time-escapement device is set in operation by the operation of the system incident to despatching a carrier.

Other features of my invention will be best understood as described in connection with the drawings in which they are illustrated, and in which—

Figure 3:
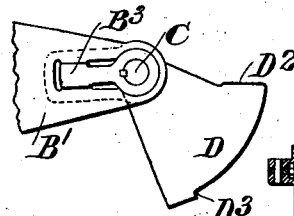
Figure 2:
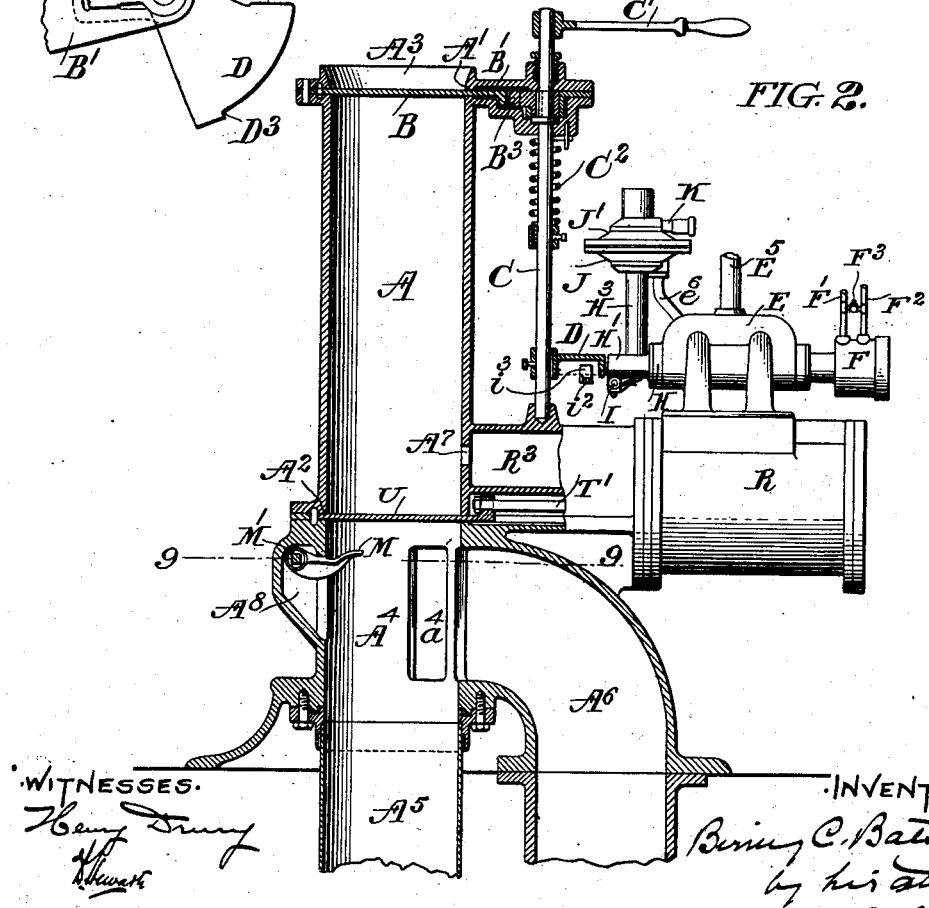
Figure 9:
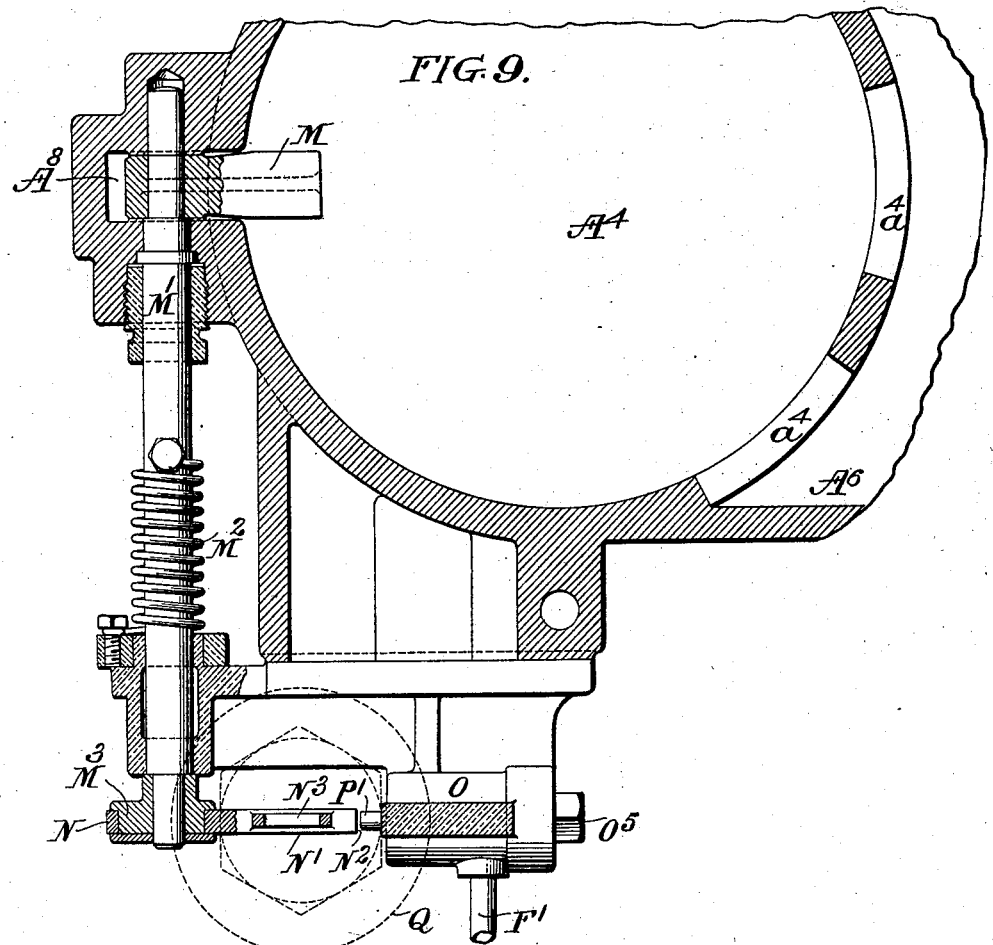
Figure 10:
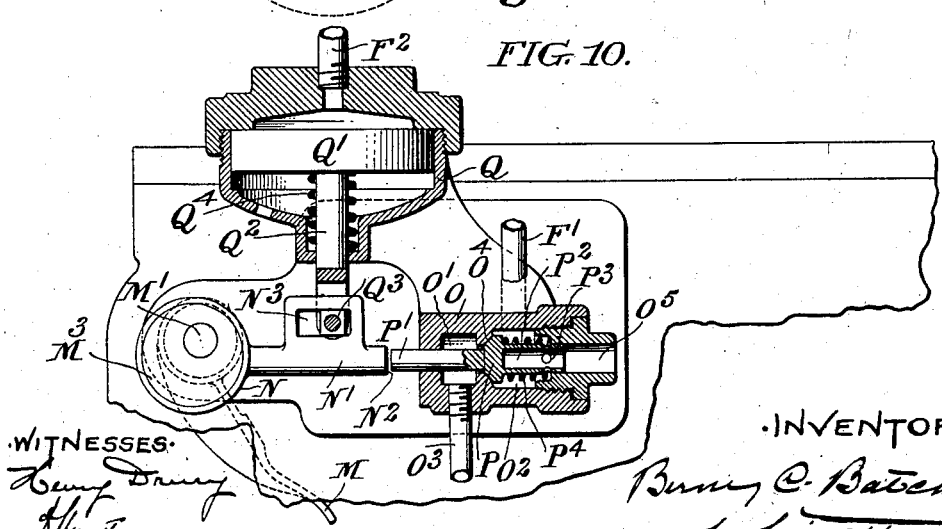

Figure 1 is a plan view of my sending apparatus; Fig. 2, a vertical section taken as on the line 2 2 of Fig. 1; Fig. 3, a plan view showing the shaft C and the gate and locking-segment attached thereto. Fig. 4 is a vertical central section through the pneumatic cylinder and the valve-chest of the apparatus; Fig. 5, a fragmentary view on the same section as Fig. 4, showing in addition mechanism for admitting and exhausting air from the cylinder F. Fig. 6 is a vertical sectional view of the pneumatic time-escapement device and parts immediately associated therewith. Fig. 7 is a perspective view of the latching device acted on by the pneumatic time escapement. Fig. 8 is a plan view of the locking-segment and parts operating in connection therewith; Fig. 9, a cross-section on the line 9 9 of Fig. 2, shown on an enlarged scale; and Fig. 10 is an elevation, on an enlarged scale, of a detail of the mechanism shown in Fig. 5.

A indicates a tube-section open at its outer end and connected at its inner end with the perforated section $A^4$ of the transmission-tube $A^5$, $a^4$ indicating the openings in the section $A^4$ through which air enters it from the pipe $A^6$, which connects in turn with a source of air under pressure. (Not shown.) As shown, the tube-section A has at its upper end a mouthpiece $A^3$, through which the carriers are inserted, between which and the end proper of the tube is a recess $A'$ for a swinging gate, (indicated at B,) the mouthpiece $A^3$ having an extension (indicated at $a^3$, Fig. 1) under which the gate swings when moved to open the tube-section. Another slot (indicated at $A^2$) is formed between the lower end of the tube-section A and the section $A^4$ for the sliding reciprocating gate, (indicated at U.)

$A^7$ indicates an opening into the section A, by which it is connected through a conduit $R^3$ with a port in the cylinder R, as will be hereinafter described.

$A^8$ indicates a recess in the section $A^4$, in which is pivoted the finger M.

As shown in Figs. 2 and 9, the upper or end gate B is connected through an extension B' with a vertical shaft C, the connection being made, as indicated in Fig. 3, by a projecting key, (indicated at $B^3$;) but the mode of connection with the shaft is immaterial.

C' indicates a handle-lever attached to the end of the shaft C, and C² a spring connected with the shaft and acting on it in a direction tending to open the end gate B. Also secured to the shaft C is the locking-segment D, which is conveniently made, as shown, with a downwardly-projecting segmental flange D', a locking-face, as indicated at D², and a locking projection, as indicated at D³.

E is a valve-chamber having in it the cylindrical valve-seat chamber, (indicated at E',) in which are formed two ports E² and E³, connecting through passages $e^2$ and $e^3$ with the ports $r$ and $r'$, leading to the front and rear ends of the pneumatic cylinder R.

E⁴ indicates the admission-port through which air under pressure enters the cylindrical valve-chamber, and E⁵ indicates the exhaust-port.

E⁶ is a port opening into the port E² and connecting through a pipe $e^6$ with the pneumatic time escapement to be described.

F is a small cylinder secured at the end of the valve-chamber E and having a pipe F' leading to its inner end and a pipe F² leading to an intermediate point near the outer end, which is uncovered by the piston G in its outer movement.

F³ indicates a connection between the pipes F' and F², having in it a valve (not shown) which permits the air to flow from the pipe F² to the pipe F', but does not permit flow in the opposite direction.

G' indicates a valve-spindle forming also the piston-rod of the piston G and to which are attached the piston-valves G² and G³, which operate in connection with the ports E² and E³, a prolongation of this rod or spindle (indicated at G⁴) forming an interlocking element of the interlocking mechanism to be described. It will be observed that the rod G⁴ lies opposite to the segmental flange D' of the segment D.

$g'$ indicates a spring the action of which is to push the valve-rod and valve in a direction to connect port E² with the port E⁴ and port E³ with port E⁵.

H is a casting secured on the front of the valve-chamber E, having, as shown, a prolongation H', which extends over the rod end G⁴. Another projection H² (see Fig. 8) supports the fulcrum $i$ of the latch $i'$.

I is a pin journaled in the downwardly-extending arms of projection H', so as to lie below the rod G⁴, said pin having secured to it a latch I', which by the action of the spring I³ is normally pressed upward, so as to engage with a detent G⁵, secured on the under side of the rod G⁴.

I² is a lever secured to the end of the pin I and extending outward in approximately the same direction as the detent I', so that its outer end lies beneath and in the path of the head J⁵, which is operated by the time-escapement device, as will be described.

$i$ is a pin journaled on the bracket H², having attached to it the latch $i'$, which when the gate B is closed, as shown in Fig. 1, engages with the detent D³ on the locking-segment D.

$i^2$ is a lever also attached to the pin $i$ and having a head $i^3$ extending out from its end and into the space lying within the segmental flange D' of the segment D, as is best shown in Figs. 6 and 8.

J and J' are respectively the lower and upper sections of a diaphragm-chamber, J² indicating the diaphragm secured between the sections, and J³ J³ clamping-plates secured to the center of the diaphragm and to which in turn is secured the rod J⁴, which passes through a stuffing-box in the lower section J and has secured to its lower end the head J⁵, J⁶ indicating a spring acting on the rod J⁴ and tending to draw it and the diaphragm downward. As shown, the diaphragm-box is supported on a tubular extension H³, secured to the casting H.

J⁷ is an opening in the upper section J' of the diaphragm-chamber, to which the air-admission-regulating device is connected, and J⁸ is an air-exhausting port at the top of the diaphragm-chamber.

The regulating device K consists of a casing having a perforation K' and supporting a threaded rod K², having a needle-like end K³, which regulates the opening of the perforation K', K⁴ indicating the handle with which the threaded end and needle are adjusted.

L is a valve held to a seat on the port J⁸ by the action of a spring L², fitting in a cup-shaped extension of the valve (indicated at L') and resting at top against a spider, such as is indicated at L³.

M is a finger extending out into the section A⁴ of the tube and pivoted in the extension A⁸ of this section, being secured to a rotatable shaft M', (see Fig. 9,) having a spring M² connected with it which acts to turn and hold the finger in the position indicated in Figs. 2 and 9, M³ indicating an eccentric secured to the shaft M', and N indicating an eccentric-strap having secured to and projecting from it a rod N', having a finger N² at its end and a slotted extension on its upper side, as indicated at N³. O (best shown in Fig. 10) is a valve-casing having formed in it two chambers O' and O², the chamber O' being connected with a source of air under pressure by a pipe O³ and the two chambers being connected together by a port O⁴. The chamber O² connects through its end with the outer air through a cylindrical passage O⁵ and also connects freely with the pipe F'.

P is a valve normally held against the port O⁴ by the action of a spring P⁴. A valve-rod P' extends from the valve through chamber O' and through the casing, so that its projecting end lies opposite to the finger N² when the parts are in the position shown in Fig. 10. From the other face of the valve extends the cylindrical rod P², the outer end of which rests in the cylindrical opening O⁵ and is provided with openings, as indicated at P³, which when the valve is seated open into the chamber O², but which are closed when the valve leaves its seat by sliding within the cylindrical passage O⁵. Q is a cylinder, the upper end of which connects with the pipe F², as shown, Q' indicating a piston working in said cylinder and having a piston-rod Q², which supports a pin Q³, working in the slot N³. Q⁴ indicates a spring acting to press the piston Q' upward to the position shown in Fig. 10.

R indicates the pneumatic cylinder, the ends of which are connected through ports $r$ and $r'$ with the ports E² and E³. In the inner head of the cylinder R is formed the valve-seated port R', as shown in Fig. 4, opening into the conduit R³, which in turn opens into the tube-section A through the opening A⁷.

S indicates a valve, which is held to the seat R' by the action of a spring S³.

S' is an inwardly-extending spindle projecting from the inner face of the valve S into the end of the cylinder R in position to be engaged by the face of the piston and pushed inward, lifting the valve from its seat, as shown in Fig. 4.

S² indicates an outwardly-extending spindle having in the construction shown no other function than to properly aline the valve.

T is the piston moving in the cylinder R and connecting through a rod T' with the inner gate U of the sender-tube.

The operation of the apparatus is as follows: The gate U is normally closed and the gate B normally open. The operator inserts a carrier in the tube A and taking hold of the handle C' turns the shaft C so as to close the gate B. In turning the shaft to this position the segment D is turned with it, and the detent D³ is engaged by the latch $i'$, as shown in Fig. 8. In turning the segment D to the position indicated its edge D² clears the end of the rod G⁴, permitting the spring $g'$ (see Fig. 4) to move the rod G' G⁴ and the valves G² G³, so as to connect the port E² with the supply-port E⁴ and the port E³ with the exhaust-port E⁵, thus admitting compressed air to the front end of the cylinder R and permitting air to exhaust from its rear end. The admission of air to the port E² also admits it through the port E⁶ and pipe $e^6$ into the lower portion of the diaphragm-chamber, and the forward movement of the rod G⁴ thrusts it across the front of the segment-face D², in which it finally comes in contact with the head $i^3$ of the lever-arm $i^2$, through which it acts on the latch $i'$, lifting it out of engagement with the detent D³ and permitting the detent to move forward through the slight distance which brings its edge D² in contact with the rod G⁴. The admission of air to the front end of the cylinder R acting on the piston T moves it and through the rod T' the gate U, permitting the carrier to pass from the sender-tube A into the tube-section A⁴ and through it into the tube A⁵, but before acting to move the piston the air entering the front end of the cylinder passes freely through the port R', the passage R³, and port A⁷ to the sender-tube A, which is thus charged with compressed air and the pressure on each side of the gate U practically equalized. As the piston T moves under the influence of the compressed air admitted to the left-hand side of the cylinder R the spring S³ causes the valve S to move toward its seat R', and, as shown, the valve will close the passage between the cylinder and chamber R³ very slightly before the gate U has moved to such a distance as to begin the opening of the passage between the sender-tube and transmission-tube, so that no air is admitted from the cylinder to the section A when the gate U is open. The air admitted to the diaphragm-chamber through the connection $e^6$ pushes the diaphragm and the rod J⁴ into the position shown in Fig. 6, the air in the upper part of the diaphragm-chamber escaping freely through the port J⁸, as the valve L is only held to its seat by light spring pressure.

As the carrier passes through the tube-section A⁴ its edge comes in contact with the finger M and pushes it downward, rotating the shaft M' of the eccentric M³ to the position indicated in Fig. 10, the spring Q⁴ acting against the piston Q' and through the rod Q² lifting the rod N' to the position indicated in Fig. 10, so that its finger N² comes opposite to the valve-spindle P'. As soon as the carrier has passed the finger M the spring M² rotates the shaft M' back to its normal position and acting through the eccentric M³ throws the rod N' against the end of the spindle P', moving the spindle inward and lifting the valve P from its seat, so that air under pressure coming through the pipe O³ and chamber O' passes through the port O⁴ into the chamber O², and the openings P³ being closed the air passes then through the pipe F' to the inner end of the cylinder F, where, acting against the piston G, it moves the said piston, the rod G', the valves G² and G³, and the rod G⁴ to the position indicated in Fig. 4; but in this position the detent G⁵ on the rod G⁴ is engaged by the latch I', as best shown in Fig. 6, holding all the parts connected with this rod in retracted position. The withdrawal of the rod G⁴ from in front of the face D² of the segment D permits this segment, together with the shaft C and gate B, to move under the influence of the spring C², opening the gate B; but before this occurs, which is only at the latter end of the backward movement of the rod G⁴, the shifting of the valves has admitted air under pressure through the port $r'$ to the rear end of the cylinder R and connected the front end of said cylinder through the port $r$ with the exhaust, causing the piston T to move to the position indicated in Fig. 4 and close the gate U. As the piston T finishes its stroke and after the gate U has closed the passage from the sender-tube the piston, coming in contact with the valve-rod S', lifts the valve S from its seat, opening the passage from the sender-tube A through the port A⁷, passage R³, port R', cylinder R, port r, &c., to the exhaust, so that the compressed air in the said chamber A is permitted to escape and the pressure in said chamber reduced to atmospheric pressure. At the end of the outward stroke of the piston G the opening of the pipe F² into the cylinder F is uncovered, permitting the compressed air to pass through the pipe F² into the top of the cylinder Q, where, acting on the piston Q', said piston pushes the rod N' downward until said finger N² passes below the end of the spindle P', permitting the valve P to close and the said spindle P' to move over the top of the finger N², in which position it remains until the finger M is again pressed downward.

The shifting of the valve G² so as to connect the port E² with the exhaust permits the compressed air to exhaust freely through the lower section of the diaphragm-chamber, whereupon the action of the spring J⁶ is at once to draw the diaphragm and rod J⁴ downward; but this downward motion of the diaphragm and rod is regulated and timed by the opening K', adjusted by the needle K³, by means of which any desired time period can be caused to elapse for the complete downward movement of the rod. At the end of the downward movement of the rod the head J⁵ comes in contact with the lever I², pressing it downward and through the spindle I pressing the latch I' downward until it is disengaged from the latch G⁵, whereupon the rod G⁴ moves forward into contact with the segmental face D' of the segment D, which holds it in position until the segment D is rotated consequent on the opening of the gate B, as already described.

It will be obvious that the rod G⁴ is in the first place and for a determined period of time locked in its rearward position by the action of the latch I², so that if during this period a carrier is placed in the section A and the gate B closed no effect will be produced on the gate U until the time escapement device has released the latch I², upon which occurrence the mechanism will operate, as hereinabove described. On the other hand, if the determined time period has elapsed before a carrier is charged into the section A the latch I² will be already disengaged and the rod G⁴ and parts connected with it held in position only by the engagement of said rod with the segmental flange D'.

My invention is capable of very numerous modifications in its merely mechanical features, those shown being the devices which I believe to be best adapted for the practical utilization of my inventive conception; but I do not wish to be understood as limiting myself to the employment of the particular devices indicated in the drawings except where they are specifically referred to as limiting elements of the claims.

Having now described my invention, what I claim as new, and desire to secure by Letters Patent, is—

1. In a sending device for a pneumatic-tube system, a tube-section A in registry with the end of the despatch-tube in combination with an end gate and an inner gate for closing the tube-section, means for opening the inner gate arranged to be set in operation by the closing of the end gate, an automatic lock arranged to prevent the opening of the inner gate when engaged, a time escapement arranged to disengage said lock a determined time after the inner gate has closed after opening.

2. In a sending device for a pneumatic-tube system, a tube-section A in registry with the end of the despatch-tube in combination with an end gate and an inner gate for closing the tube-section, means for first admitting compressed air to the tube-section and then opening the inner gate arranged to be set in operation by the closing of the end gate, an automatic lock arranged to prevent the opening of the inner gate when engaged, a time escapement arranged to disengage said lock a determined time after the inner gate has closed after opening, and means for first closing the inner gate and then opening the end gate arranged to be set in operation by the exit of a carrier from the tube-section.

3. In a sending device for a pneumatic-tube system, a tube-section A in registry with the end of the despatch-tube in combination with an end gate and an inner gate for closing the tube-section, a pneumatic cylinder connected to open and close the inner gate, a valve governing the admission and exhaust of air from said cylinder, a spring acting to move and hold said valve in position to admit air to open the gate, a pneumatic cylinder connected with the valve to move it in the opposite direction, a rod, as G⁴, moving with the valve, a device, as shaft C, for moving the end gate, a spring acting to open said gate, an interlocking device, as segment D, moving with the device for moving the end gate, said interlocking device being engaged by rod G⁴ when the end gate is closed and the valve moved by its spring to open the inner gate and the end gate thereby prevented from opening and said rod G⁴ being engaged by the segment when the end gate is open and the valve moved to close the inner gate and the inner gate thereby prevented from opening, and a device, as finger M, arranged to be actuated by a carrier issuing from the tube-section A and operating to admit air to the cylinder connected with the valve to shift said valve and rod G⁴ to the position corresponding to the closed position of the inner gate.

4. In a sending device for a pneumatic-tube system, a tube-section A in registry with the end of the despatch-tube in combination with an end gate and an inner gate for closing the tube-section, a pneumatic cylinder connected to open and close the inner gate, a valve governing the admission and exhaust of air from said cylinder, a spring acting to move and hold said valve in position to admit air to open the gate, a pneumatic cylinder connected with the valve to move it in the opposite direction, a rod, as $G^4$, moving with the valve, a device, as shaft C, for moving the end gate, a spring acting to open said gate, an interlocking device as segment D, moving with the device for moving the end gate, said interlocking device being engaged by rod $G^4$ when the end gate is closed and the valve moved by its spring to open the inner gate and the end gate thereby prevented from opening and said rod $G^4$ being engaged by the segment when the end gate is open and the valve moved to close the inner gate and the inner gate thereby prevented from opening, a supplemental automatic latch, as $i'$, operating to engage and hold the segment when the end gate is closed, means for releasing said latch actuated by the rod $G^4$ after it has moved to position to engage and lock the segment, and a device, as finger M, arranged to be actuated by a carrier issuing from the tube-section A and operating to admit air to the cylinder connected with the valve to shift said valve and rod $G^4$ to the position corresponding to the closed position of the inner gate.

5. In a sending device for a pneumatic-tube system, a tube-section A in registry with the end of the despatch-tube in combination with an end gate and an inner gate for closing the tube-section, a pneumatic cylinder connected to open and close the inner gate, a valve governing the admission and exhaust of air from said cylinder, a spring acting to move and hold said valve in position to admit air to open the gate, a pneumatic cylinder connected with the valve to move it in the opposite direction, a rod, as $G^4$, moving with the valve, an automatic latch, as $I'$, arranged to engage rod $G^4$ when the valve is moved to position to close the inner gate, a device, as shaft C, for moving the end gate, a spring acting to open said gate, an interlocking device, as segment D, moving with the device for moving the end gate, said interlocking device being engaged by rod $G^4$ when the end gate is closed and the valve moved by its spring to open the inner gate and the end gate thereby prevented from opening and said rod $G^4$ being engaged by the segment when the end gate is open and the valve moved to close the inner gate and the inner gate thereby prevented from opening, a pneumatic time escape set in operation by the shifting of the valve to open the inner gate and operating to engage latch $I'$ a determined time after said gate closes, and a device, as finger M, arranged to be actuated by a carrier issuing from the tube-section A and operating to admit air to the cylinder connected with the valve to shift said valve and rod $G^4$ to the position corresponding to the closed position of the inner gate.

6. In a sending device for a pneumatic-tube system, a tube-section A in registry with the end of the despatch-tube in combination with an end gate and an inner gate for closing the tube-section, a pneumatic cylinder connected to open and close the inner gate, a valve governing the admission and exhaust of air from said cylinder, a spring acting to move and hold said valve in position to admit air to open the gate, a pneumatic cylinder connected with the valve to move it in the opposite direction, a rod, as $G^4$, moving with the valve, an automatic latch, as $I'$, arranged to engage rod $G^4$ when the valve is moved to position to move the inner gate, a device as shaft C, for moving the end gate, a spring acting to open said gate, an interlocking device, as segment D, moving with the device for moving the end gate, said interlocking device being engaged by rod $G^4$ when the end gate is closed and the valve moved by its spring to open the inner gate and the end gate thereby prevented from opening and said rod $G^4$ being engaged by the segment when the end gate is open and the valve moved to close the inner gate and the inner gate thereby prevented from opening, a pneumatic time escapement set in operation by the shifting of the valve to open the inner gate and operating to engage latch $I'$ a determined time after said gate closes, a supplemental automatic latch, as $i'$, operating to engage and hold the segment when the end gate is closed, means for releasing said latch actuated by the rod $G^4$ after it has moved to position to engage and lock the segment, and a device, as finger M, arranged to be actuated by a carrier issuing from the tube-section A and operating to admit air to the cylinder connected with the valve to shift said valve and rod $G^4$ to the position corresponding to the closed position of the inner gate.

7. In a sending device for pneumatic-tube systems comprising the tube-section A having end and inner gates, the combination with the inner gate of a cylinder R having a port $R'$ connecting with the tube-section A, a valve S having a spindle $S'$ extending into the cylinder, said valve being held to its seat by a spring, and a piston T working in the cylinder R and connected with the gate, said piston pressing against the spindle $S'$ and holding the valve S open when the gate is closed.

8. In a sending device for pneumatic-tube systems comprising the tube-section A having end and inner gates and a pneumatic cylinder for actuating the inner gate, the combination of the shaft C secured to and operating the end gate having a segment D secured to it with a valve-rod $G^4$ moving with the valve governing the admission and exhaust of the cylinder aforesaid, said segment and rod being arranged to interlock with each other, as described.

9. In a sending device for pneumatic-tube systems comprising the tube-section A having end and inner gates and a pneumatic cylinder for actuating the inner gate, the combination of the shaft C secured to and operating the end gate having a segment D secured to it with a valve-rod G⁴ moving with the valve governing the admission and exhaust of the cylinder aforesaid, said segment and rod being arranged to interlock with each other as described, an automatic lock acting to engage the segment when the end gate is closed and a latch-opening device actuated by the rod G⁴ when it moves to engage and lock the segment.

10. In a sending device for pnuematic-tube systems comprising the tube-section A having end and inner gates and a pneumatic cylinder for actuating the inner gate, the combination of the shaft C secured to and operating the end gate having a segment D secured to it with a valve-rod G⁴ moving with the valve governing the admission and exhaust of the cylinder aforesaid said segment and rod being arranged to interlock with each other as described, an automatic lock, acting to engage and hold the rod G⁴ when it is retracted and a time-escapement device acting to disengage said lock a determined time after the rod has been retracted.

BIRNEY C. BATCHELLER.

Witnesses:
 EDWD. C. REGN,
 D. STEWART.